United States Patent
Ghalebi et al.

(10) Patent No.: US 10,728,991 B1
(45) Date of Patent: Jul. 28, 2020

(54) FIXTURE GROUPING AND CONFIGURATION IN DISTRIBUTED LIGHTING SYSTEMS

(71) Applicant: XELEUM LIGHTING, Boynton Beach, FL (US)

(72) Inventors: Mehrdad Ghalebi, Peekskill, NY (US); Marc Lindahl, New York, NY (US); Scott Harrell, Baton Rouge, LA (US)

(73) Assignee: Xeleum Lighting, Boynton Beach, FL (US)

( * ) Notice: Subject to any disclaimer, the term of this patent is extended or adjusted under 35 U.S.C. 154(b) by 0 days.

(21) Appl. No.: 16/155,431

(22) Filed: Oct. 9, 2018

(51) Int. Cl.
| | |
|---|---|
| *H05B 33/00* | (2006.01) |
| *H05B 47/19* | (2020.01) |
| *H04L 29/08* | (2006.01) |
| *H05B 47/11* | (2020.01) |
| *H05B 47/105* | (2020.01) |
| *H05B 47/155* | (2020.01) |

(52) U.S. Cl.
CPC .......... *H05B 47/19* (2020.01); *H04L 67/12* (2013.01); *H05B 47/105* (2020.01); *H05B 47/11* (2020.01); *H05B 47/155* (2020.01)

(58) Field of Classification Search
CPC .................. H05B 37/0272; Y02B 20/445
See application file for complete search history.

(56) References Cited

U.S. PATENT DOCUMENTS

| | | | |
|---|---|---|---|
| 6,836,737 B2 | 12/2004 | Petite et al. | |
| 6,914,893 B2 | 7/2005 | Petite | |
| 7,103,511 B2 | 9/2006 | Petite | |
| 7,263,073 B2 | 8/2007 | Petite et al. | |
| 7,468,661 B2 | 12/2008 | Petite et al. | |
| 7,772,540 B2 | 8/2010 | Pasternak | |
| 7,847,706 B1 | 12/2010 | Ross et al. | |
| 8,421,588 B1 | 4/2013 | Ross et al. | |
| 8,924,587 B2 | 12/2014 | Petite | |
| 8,964,708 B2 | 2/2015 | Petite | |
| 9,439,126 B2 | 9/2016 | Petite | |
| 2007/0291483 A1* | 12/2007 | Lys .................. | A01M 1/04 362/227 |
| 2010/0069035 A1* | 3/2010 | Johnson ............. | H04W 92/18 455/404.1 |
| 2012/0142429 A1* | 6/2012 | Muller .............. | A63F 13/45 463/42 |

* cited by examiner

*Primary Examiner* — Monica C King
(74) *Attorney, Agent, or Firm* — Lowenstein Sandler LLP

(57) ABSTRACT

Systems and methods for lighting fixture grouping and configuration in a distributed lighting system equipped with a wireless lighting network. An example method comprises: receiving, via a graphical user interface (GUI) rendered by a lighting network management application of a distributed lighting system, a command to associate a lighting fixture with a lighting fixture group; transmitting, to the lighting fixture, an update command specifying an identifier of the lighting fixture group and a value of a fixture configuration parameter; receiving, from the lighting fixture, an acknowledgement of the update command; incrementing a counter of lighting fixtures associated with the lighting fixture group; and displaying the counter in a visual association with a GUI element representing the lighting fixture group.

13 Claims, 7 Drawing Sheets

US 10,728,991 B1

FIXTURE GROUPING AND CONFIGURATION IN DISTRIBUTED LIGHTING SYSTEMS

TECHNICAL FIELD

The present disclosure is generally related to computer systems, and is specifically related to distributed lighting systems equipped with wireless lighting control networks.

BACKGROUND

Lighting control systems are utilized to control lighting devices installed for indoor and outdoor lighting of commercial, industrial, or residential spaces. A lighting control system may allow controlling multiple lighting devices and/or groups of lighting devices from a single user interface device.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for fixture grouping and configuration in wireless lighting control networks. A "lighting control network" herein shall refer to a wireless network employed for controlling a distributed lighting system. The latter may include a large number of lighting fixtures which are installed in one or more physical spaces and are equipped with RF transceivers, various sensors, and voltage control devices. Wireless lighting control networks bring the desirable property of being easy to install or retrofit into existing installations.

In a typical operating scenario, a distributed lighting system managed by a lighting control network may include thousands of lighting fixtures installed in multiple physical spaces (e.g., in multiple rooms which are located on one or more floors of a building). Commissioning the distributed lighting system would involve automated discovery and configuration of installed lighting fixtures by the lighting control network.

The present disclosure provides efficient methods of lighting fixture grouping and configuration, which are described in more detail herein below. The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

Figure 1:
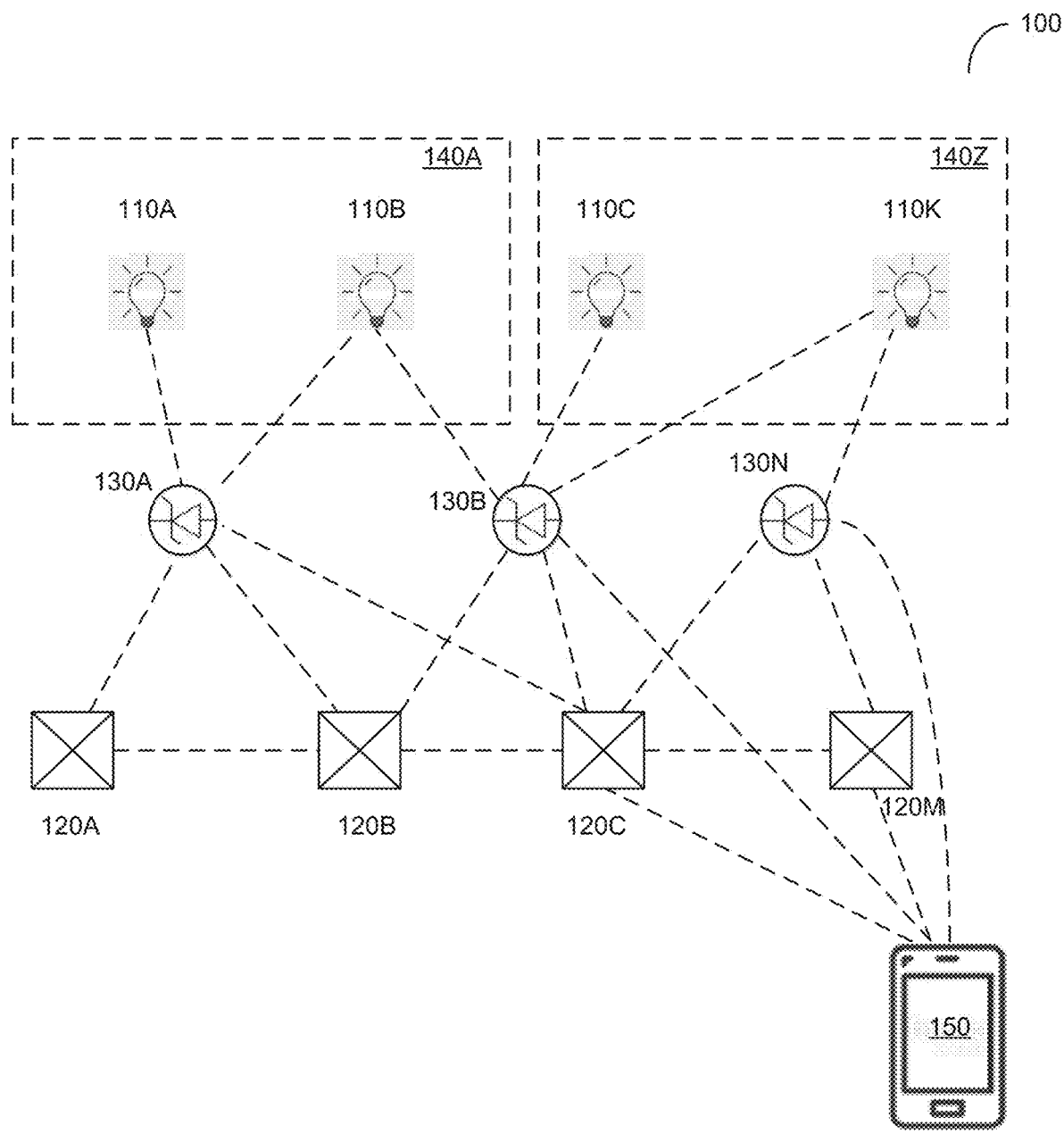
FIG. 1 schematically illustrates an example lighting control network in which the methods and systems described herein may be implemented.

FIG. 1 schematically illustrates an example lighting control network in which the methods and systems described herein may be implemented. The example lighting control network 100 may include a plurality of lighting fixtures 110A-110K, sensors 120A-120M (e.g., illumination sensors, temperature sensors, motion sensors, occupancy sensors, etc.), and/or control devices 130A-130N (e.g., voltage regulating devices such as faders, switches, etc.), which are referred to as "network nodes." Various auxiliary components and/or methods of their interconnection may be omitted from FIG. 1 for clarity and conciseness.

A lighting fixture may be equipped with one or more sensors and/or one or more control devices. Additionally or alternatively, the example lighting control network 100 may include standalone sensors and/or standalone control devices. Each device (such as lighting fixture, sensor, or control device) may be equipped with a radio frequency (RF) transceiver and a microcontroller implementing a network protocol stack and a driver for communicating to the wireless lighting control network node hardware (e.g., lightning fixture controls, one or more sensors, or a voltage regulating device). Thus, the lighting control network nodes may wirelessly communicate to each other and/or to one or more mobile computing devices running a lighting network management application. In order to increase the bandwidth utilization efficiency, the messages in the network may be carried by multicast or broadcast packets, which would be received by all RF transceivers within the radio signal reception range. The network nodes may be configured to re-broadcast at least some of the received packets, thus enabling packet delivery to destination nodes which are not capable of directly communicating to the packet originating node.

In certain implementations, the wireless lighting control network nodes may be grouped into one or more groups 140A-140Z. The grouping may reflect a functional classification of the wireless lighting control network nodes comprised by each group (e.g., lighting fixtures of a certain type), a spatial position of the wireless lighting control network nodes comprised by the group (e.g., lighting fixtures located within a specified physical area), and/or other features of the wireless lighting control network nodes.

For efficiently performing the lighting fixture discovery and configuration, a user may employ a mobile computing device 150 equipped with at least one wireless communication interface (e.g., a notebook computer, a tablet, or a smartphone) to run a lighting network management application. In certain implementations, the mobile computing device may act as a lighting network node and may be implemented as example wireless lighting control network node 1000 of FIG. 7.

The lighting network management application may be employed for lighting fixture discovery and configuration. Various configuration tasks may include, e.g., grouping of discovered lighting fixtures and specifying various operational parameters for individual fixtures and/or fixture groups. The operational parameters may be related to the brightness levels, occupancy sensing, ambient light sensing, adjusting sensor-activated light levels, various time-out settings, etc.

Figure 2:
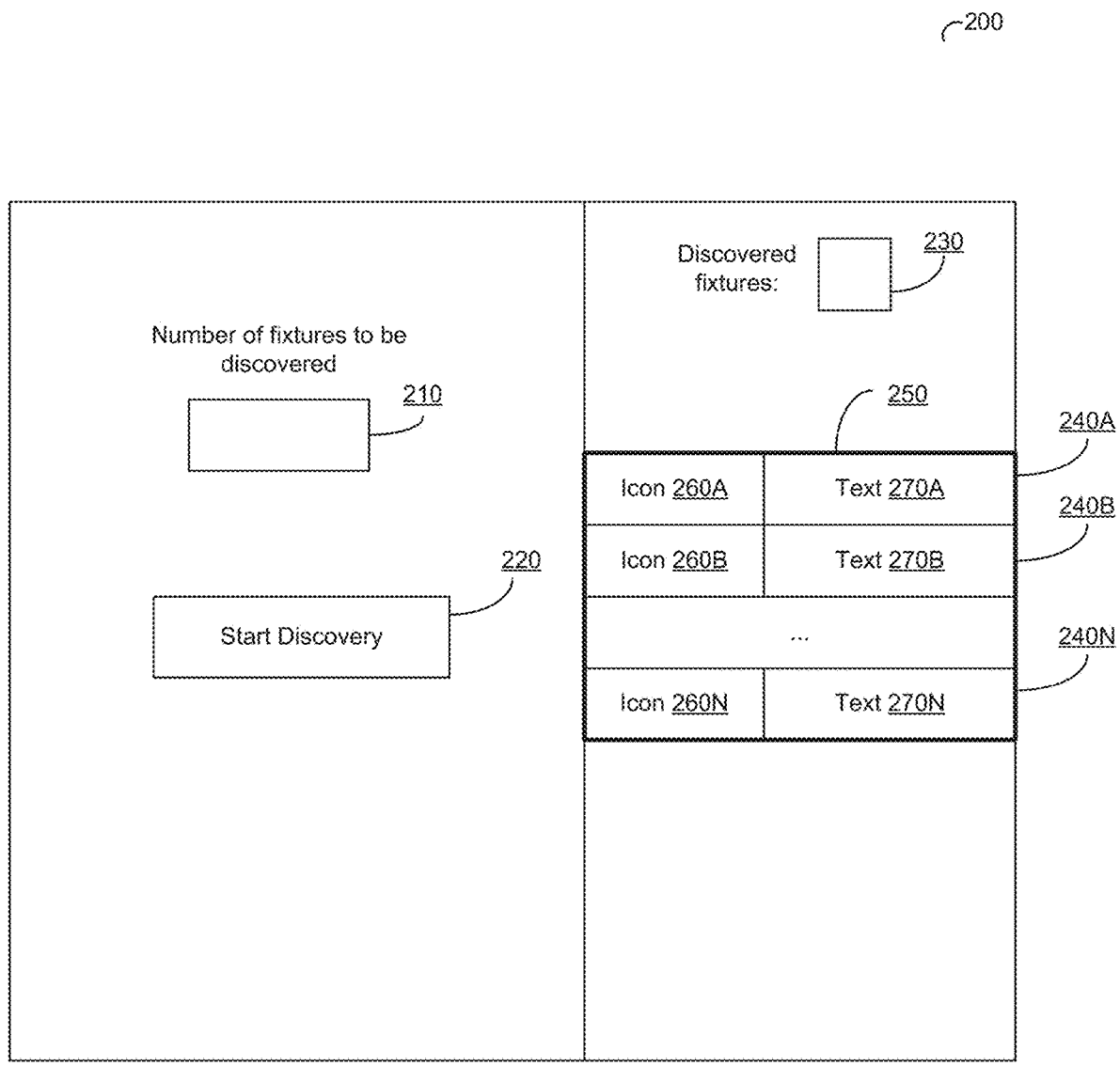
FIG. 2 schematically illustrates an example graphical user interface (GUI) screen rendered by a lighting network management application for performing lighting fixture discovery, in accordance with one or more aspects of the present disclosure.

FIG. 2 schematically illustrates an example graphical user interface (GUI) screen rendered by the lighting network management application for performing lighting fixture discovery, in accordance with one or more aspects of the present disclosure. Upon starting the application, the user may, upon specifying the number of installed fixtures to be discovered 210, issue a discovery command (e.g., by activating a corresponding graphical user interface (GUI) control, such as button 220).

Responsive to receiving the discovery command, the lighting network management application may broadcast, via the wireless lighting network, a node identification request instructing all receiving nodes to respond by a unicast packet addressed to the management node which has transmitted the node identification request. In certain implementations, the node identification request may specify one or more status parameters (such as the motion or occupancy status) to be reported by the receiving node back to the lighting network management application. In certain implementations, the node identification request may further specify the current time, such that the receiving nodes may set their real-time clocks to the specified time value.

Each node may respond by transmitting a node identification message, which may include the unique identifier of the responding node and the model identifier (or product identifier) of the lighting fixture which the responding node represents. The node identification request and response may include various other parameters, e.g., an identifier of the radio frequency (RF) channel which is configured in the local node settings (i.e., the primary RF channel for the node); an example structure of network packets utilized to carry node identification requests and responses is described in more detail herein below with reference to FIG. 3.

In certain implementations, a responding node may transmit the node identification message using the primary RF channel which is configured in the local node settings and/or the default RF channel (e.g., channel 1) utilized for fixture configuration and grouping. Utilizing the default RF channel for fixture configuration and grouping improves the efficiency and accuracy of the configuration process, as it eliminates the need for the lighting network management application to scan multiple RF channels on which the node identification messages may otherwise be transmitted.

In certain implementations, the lighting fixtures may be equipped with infrared (IR) transceivers, while the user may point to a certain fixture by an IR remote control device and push a button thus instructing the remote control device to transmit a request for identification to the lighting fixture. Responsive to receiving the identification request, the lighting fixture may flash one or more LEDs to indicate the successful reception of the identification request, and may respond by transmitting a node identification message using the radio frequency (RF) channel which is configured in the local node settings and/or the default RF channel (e.g., channel 1) utilized for fixture configuration and grouping. Using an IR remote control for fixture grouping may provide a very efficient method of fixture discovery and grouping, since only the lighting fixture which is pointed to by the IR remote control will be responding by transmitting the fixture identification message.

Figure 4:
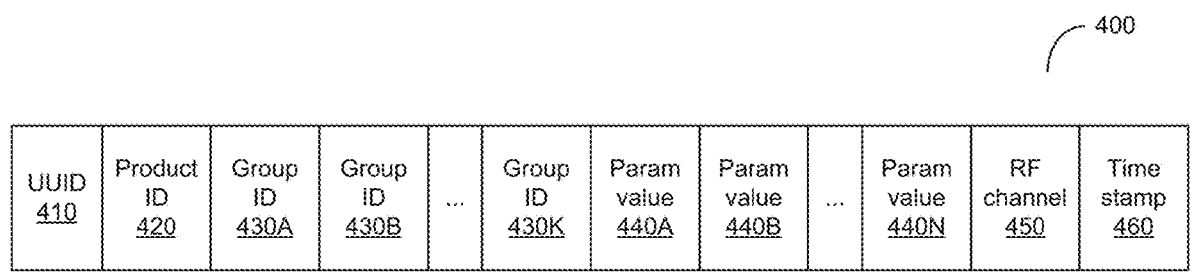
FIG. 4 schematically illustrates an example structure of the lighting fixture record maintained by a lighting network management application operating in accordance with one or more aspects of the present disclosure.

Upon receiving and validating each node identification message, the lighting network management application may update the lighting fixture registry associated with the lighting control network, by creating or updating a lighting fixture record corresponding to the lighting fixture represented by the responding node. An example structure of the lighting fixture record is schematically illustrated by FIG. 4. In an illustrative example of FIG. 4, the lighting fixture record 400 may include the node unique identifier 410 and the lighting fixture product (model) identifier 420. The lighting fixture record 400 may further include one or more group identifiers 430A-430K which identify the groups with which the lighting fixture is associated. The lighting fixture record 400 may further include one or more lighting fixture parameter values 440A-440N which have been reported by the node representing the lighting fixture. The lighting fixture record 400 may further include an identifier of the radio frequency (RF) channel 450 on which the RF transceiver of the responding node currently operates. The lighting fixture record 400 may further include the timestamp 460 corresponding to the time of the record creation or update. The lighting fixture record 400 may further include various other fields, which are omitted from FIG. 4 for clarity and conciseness.

Referring again to FIG. 2, upon receiving and validating each node identification message, the lighting network management application may update the displayed counter of discovered fixtures 230, which thus plays a role of a visual progress indicator. The lighting network management application may update a visual slot 240A representing the responding node in the display panel 250, which provides a visual representation of at least a part of the list of discovered lighting fixtures. In certain implementations, the display panel 250 contains the slots 240A-240N corresponding to a subset of the most recently discovered lighting fixtures. The display panel may include a scroll bar (not shown in FIG. 2) and/or other GUI controls to facilitate scrolling through the list of discovered lighting fixtures.

Each slot 240 may include an icon 260 and/or text 270 graphically representing the responding node. In an illustrative example, the icon 260 may graphically encode the lighting fixture model identifier (e.g., may include an image of a lighting fixture of the specified model). The text 270 may specify the lighting fixture type and/or model. In certain implementations, the text 270 may further specify one or more group identifiers which identify the groups with which the lighting fixture is associated. In certain implementations, the text 270 may further specify an identifier of the RF channel on which the RF transceiver of the responding node currently operates, and/or other parameters of the lighting fixture.

The example GUI screen is shown in FIG. 2 for illustrative purposes only; various GUI elements and controls may be omitted from FIG. 2 for clarity and conciseness. Furthermore, various alternative GUI elements and controls, which are not shown in FIG. 2, may be utilized by the lighting network management application for visually representing the status of lighting fixture discovery.

In certain implementations, validating the node identification message may involve evaluating one or more logical conditions which are defined on one or more fields of the header of the node identification message packet (e.g., validating the cyclic redundancy code (CRC) of the contents of the packet, validating the packet size, and/or validating the hop count value).

In certain implementations, the node identification message may be further validated by evaluating one or more logical conditions defined on one or more fields of the payload of the node identification message packet, thus filtering the responding nodes by the node status. In an illustrative example, in a large installation, the user may wish to only discover and identify a subset of the installed fixtures, e.g., by moving through the installation site and configuring the fixtures that has triggered the motion sensor. In certain implementations, the node identification request may include a power toggle parameter instructing the receiving node to toggle the power of the lighting fixture, thus allowing the user to visually identify the discovered fixtures.

At least some of the lighting fixtures may be equipped with motion sensors, which may be employed for motion and occupancy sensing. The motion sensing mode or occupancy sensing mode by each individual lighting fixture or group of lighting fixtures may be disabled or enabled by the lighting control system. The motion- and occupancy-related operational parameters, which may be specified via the lighting network management application, include the unoccupied brightness level (i.e., the brightness level to be yielded by the fixture when no occupancy is detected), the motion timeout (i.e., the period of time to elapse from no occupancy detection before the lighting fixtures are switched to the unoccupied level), and the occupied brightness (i.e., the brightness level to be yielded by the fixture when the occupancy is detected or the occupancy sensing is disabled). If the occupancy sensing mode is enabled, a motion detected by a single fixture may be propagated to the other fixtures of the group (e.g., by a broadcast or multicast packet transmitted by the fixture).

Thus, in order to implement the motion-based discovery and configuration, the node discovery request transmitted by the lighting network management application may instruct each receiving node to enable the asynchronous reporting mode (in which the node would send the status data asynchronously rather than in response to a specific status request), and may specify one or more status parameters (such as the motion or occupancy status) to be reported by the receiving node back to the lighting network management application. In certain implementations, the node discovery request may instruct each receiving node to report the specified status parameters responsive to detecting a change in at least one of the specified status parameters (e.g., motion or occupancy status change).

Responsive to receiving each node-originated message, the lighting network management application may validate the message by comparing the reported motion or occupancy status to a pre-defined value and dropping the node-originated messages which reported no detected motion or occupancy, thus only processing only those node-originated messages in which the responding node has detected motion or occupancy. Alternatively, the lighting network management application may validate the message by dropping the node-originated messages which reported no change in the detected motion or occupancy status, thus only processing only those node-originated messages in which the responding node has toggled the motion or occupancy status.

Additionally or alternatively, an IR remote control-driven fixture discovery method may be implemented, in which the user may point to a certain fixture by an IR remote control device and push a button thus instructing the remote control device to transmit a request for identification to the lighting fixture. Responsive to receiving the identification request, the lighting fixture may flash one or more LEDs to indicate the successful reception of the identification request, and may respond by transmitting a node identification message using the radio frequency (RF) channel which is configured in the local node settings and/or the default RF channel (e.g., channel 1) utilized for fixture configuration and grouping.

As noted herein above, responsive to receiving a node identification message, the lighting network management application may update a visual slot 240 representing the responding node in the display panel 250, in which at least part of the list of discovered fixtures is displayed. In an illustrative example, the display panel 250 may display the slots 240 in the reverse order of the motion or occupancy status toggle times, thus displaying at the top of the list the visual slot 240A representing the lighting fixture which has changed its motion or occupancy status most recently among all lighting fixtures, followed by the visual slot 240B representing the lighting fixture which has changed its motion or occupancy status immediately before the lighting fixture represented by the slot 240A, etc. In another illustrative example, the display panel 250 may display the slots 240 in the reverse order of receiving the corresponding node identification messages, thus displaying at the top of the list the visual slot 240A representing the lighting fixture whose node identification message was received most recently among all node identification messages, followed by the visual slot 240B representing the lighting fixture which has transmitted its node identification message immediately before the lighting fixture represented by the slot 240A, etc.

For each validated node-originated message, the lighting network management application may update the lighting fixture registry associated with the lighting control network, by creating or updating a lighting fixture record corresponding to the lighting fixture represented by the responding node, as described in more detail herein above.

Upon discovering the specified number of the lighting fixtures, the lighting network management application may display a notification to the user and may allow the user to configure the discovered lighting fixtures. The lighting fixture configuration may involve accepting user input specifying fixture grouping and various fixture configuration parameters, which may be communicated to the lighting fixture by broadcast, multicast, and/or unicast messages carrying the specified parameter values.

Figure 5:
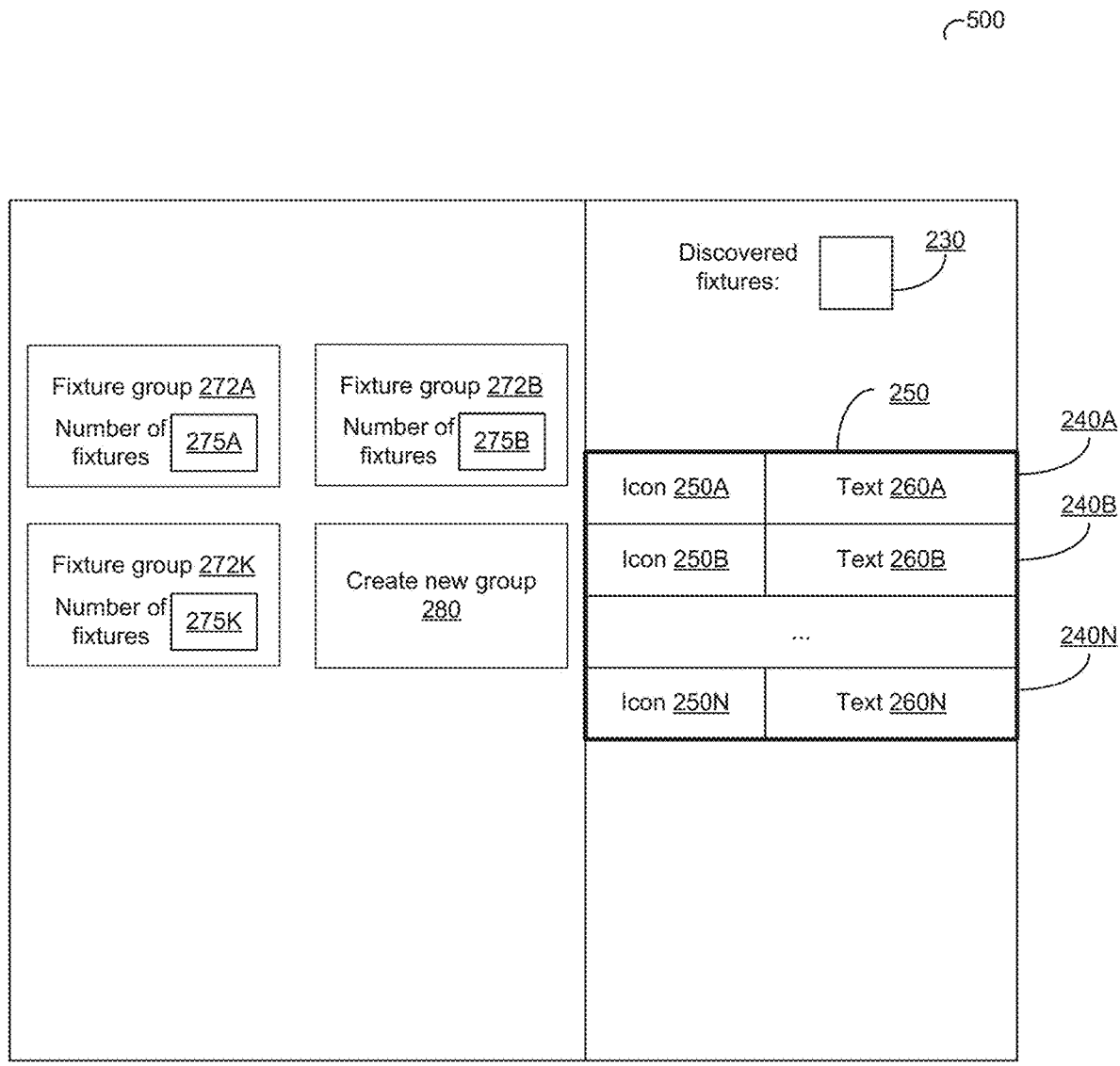
FIG. 5 schematically illustrates an example graphical user interface (GUI) screen rendered by a lighting network management application for performing lighting fixture grouping and configuration, in accordance with one or more aspects of the present disclosure.

In an illustrative example, upon completing the lighting fixture discovery, the lighting network management application may render a GUI screen configured to accept the user input specifying the lighting fixture grouping and configuration parameters, as schematically illustrated by FIG. 5. The GUI screen 500 may include one or more GUI elements, such as boxes 272A-272K, representing existing fixture groups, and may further display a GUI element, such as a button 280, for accepting a user interface command to create a new fixture group. In order to associate a lighting fixture with a group, the user may select the slot 240 representing the lighting fixture in the lighting fixture list displayed within the panel 250, and may drag the selected slot 240 to a box 272 representing the lighting fixture group to include the lighting fixture. The example GUI screen is shown in FIG. 5 for illustrative purposes only; various GUI elements and controls may be omitted from FIG. 5 for clarity and conciseness. Furthermore, various alternative GUI elements and controls, which are not shown in FIG. 5, may be utilized by the lighting network management application for facilitating the grouping and configuration of lighting fixtures.

Responsive to accepting the user interface command associating a lighting fixture with a group, the lighting network management application may retrieve from a data store the group settings, which may include the lighting fixture group identifier, one or more fixture configuration parameter values which are shared by the fixtures comprised by the group, and/or an identifier of the RF channel associated with the group. The lighting network management application may then generate an update command to be transmitted to the lighting fixture. The update command may include the lighting fixture group identifier and one or more fixture configuration parameter values which are shared by the fixtures comprised by the group. The fixture configuration parameters may include the unoccupied brightness level, the motion timeout, and/or the occupied brightness. In certain implementations, the update command may further include the identifier of the RF channel associated with the group. In certain implementations, the update command may further specify the current time, such that the lighting fixture may set its real-time clock to the specified time value.

The lighting network management application may append the update command to an outgoing communication queue which stores the configuration commands to be transmitted over the wireless lighting network. A dedicated thread of the lighting network management application may retrieve the commands from the queue and transmit the commands to the lighting fixtures by broadcast, multicast, and/or unicast messages.

Upon receiving a configuration command, a lighting fixture may validate the command by evaluating one or more logical conditions which are defined on one or more fields of the header of the packet which carries the fixture configuration command (e.g., the cyclic redundancy code (CRC) of the contents of the packet, the packet size, and/or the hop count value). In certain implementations, the fixture configuration command may be further validated by evaluating one or more logical conditions defined on one or more fields of the payload of the packet which carries the fixture configuration command (e.g., validating the group identifier and/or one or more parameter values by comparing them to respective pre-configured ranges). Upon successfully validating the incoming fixture configuration command, the lighting fixture may update the configuration parameters using the parameter values specified by the fixture configuration command, and may transmit a configuration acknowledgement back to the management node.

Responsive to receiving the configuration acknowledgement, the lighting network management application may update (e.g., increment or decrement) the counter of lighting fixtures associated with the lighting fixture group that includes the lighting fixture which has originated the configuration acknowledgement. The lighting network management application may display the updated counter 275 within the display box 272 representing the lighting fixture group.

In certain implementations, the lighting network management application may implement the group edit mode, in which the user may select an existing lighting fixture group and adjust parameters of the lighting fixtures comprised by the selected group. In an illustrative example, the lighting network management application may display a GUI screen comprising a plurality of buttons corresponding to existing lighting fixture group. Upon receiving a user interface command selecting a lighting fixture group, the lighting network management application may display GUI controls for adjusting the parameter values of the lighting fixtures comprised by the selected groups. The fixture configuration parameters may include the unoccupied brightness level, the motion timeout, and/or the occupied brightness. In various illustrative examples, the GUI controls may be provided by sliders, drop-down menus, radio-buttons, numerical input fields, etc.

Responsive to accepting the user input specifying the lighting fixture settings, the lighting network management application may generate a group update command to be transmitted to the lighting fixtures comprised by the selected group. The group update command may include the lighting fixture group identifier and one or more fixture configuration parameter values. In certain implementations, the group update command may further specify the current time, such that the lighting fixture may set its real-time clock to the specified time value. The lighting network management application may append the group update command to the outgoing communication queue. A dedicated thread of the lighting network management application may retrieve the commands from the queue and transmit the commands to the lighting fixtures by broadcast, multicast, and/or unicast messages.

At least some of the fixtures may fail to acknowledge the group update command. The lighting network management application may identify one or more lighting fixtures that failed to acknowledge the group update command within a pre-defined period of time; such lighting fixtures would be placed in an error handling list, and an error recovery procedure may be initiated. In certain implementations, the lighting network management application may display an error indicator in a visual association with the display box 272 representing the lighting fixture group associated with the non-responsive lighting fixtures. Responsive to accepting a user input requesting the group synchronization, the lighting network management application may resend the group update command by broadcast messages, multicast messages, and/or unicast messages addressed to the non-responsive lighting fixtures. Additionally or alternatively, the group update command may be resent responsive to detecting a non-UI triggering event, such as expiration of a pre-defined period of time after the previous attempt to send the group update command.

Thus, the lighting network management application implementing the methods of the present disclosures facilitates efficient commissioning of distributed lighting systems. In various implementations, the lighting network management application may implement various auxiliary functions which are not described herein for clarity and conciseness.

Figure 3:
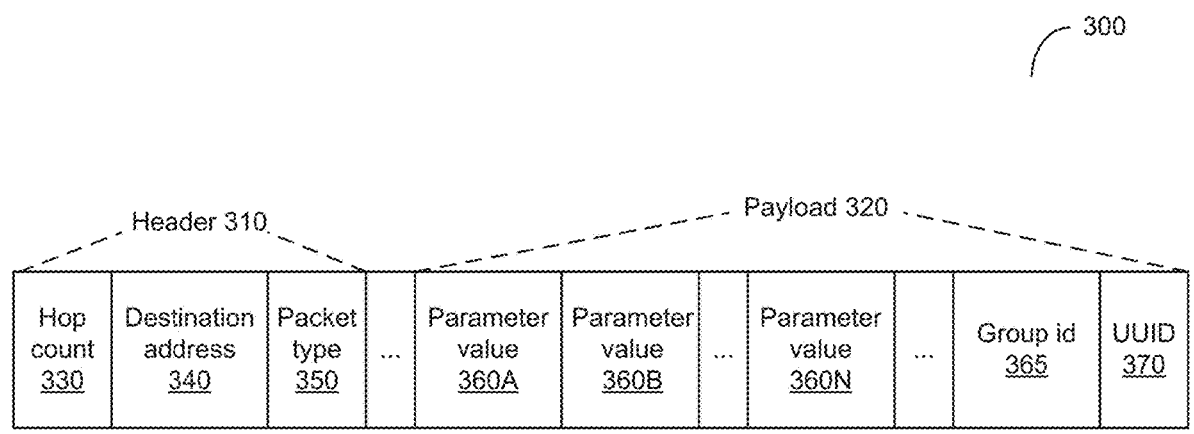
FIG. 3 schematically illustrates an example packet structure which may be utilized by a lighting control network operating in accordance with one or more aspects of the present disclosure.

As noted herein above, messages in the example lighting control network 100 of FIG. 1 may be carried by multicast or broadcast packets. FIG. 3 schematically illustrates an example packet structure which may be utilized by the example lighting control network 100 of FIG. 1. As schematically illustrated by FIG. 3, the network packet 300 may include the header 310 and the payload 320. The packet header 310 may, in turn, include the hop count 330, the destination address 340, the packet type 350, and various other fields. The destination address 340 may be provided by a broadcast address (i.e., a reserved address identifying a group including all network nodes), a multicast address (i.e., an identifier of a group including multiple network nodes), or a unicast address (i.e., a unique identifier of the destination network node). The packet type field 350 may encode the operation to be performed by the destination network node, such as transmitting a response packet specifying the current value of a specified status parameter, setting the value of a specified configuration parameter to a value supplied by the packet payload, setting the local real-time clock to a value supplied by the packet payload, transmitting a response packet specifying the product identifier and the unique identifier (UID) of the wireless lighting control network node, etc.

Node identification request packets may have no payload. Node identification message packets may specify the values of one or more lighting fixture parameters 360A-360N and the lighting fixture unique identifier 370. Node configuration packets may further specify the lighting fixture group identifier 365.

In certain implementations, in addition to the broadcast transmissions, the lighting control network may further support the multicast packet addressing mode. In the multicast addressing mode, the destination address field of the packet header specifies an identifier of a multicast group. A reserved multicast group identifier (e.g., 0xff) may be utilized for denoting a broadcast group including all network nodes, thus effectively implementing the broadcast addressing mode. In addition to the broadcast group, each network node may belong to one or more multicast groups. The grouping may reflect a functional classification of the wireless lighting control network nodes comprised by each group (e.g., lighting fixtures of a certain type), a spatial position of the wireless lighting control network nodes comprised by the group (e.g., motion sensors located within a specified physical area), and/or other features of the wireless lighting control network nodes.

In certain implementations, in addition to the broadcast and multicast packet addressing mode, the lighting control network may further support the unicast addressing mode, in which the destination address field of the packet header uniquely identifies the destination network node.

In an illustrative example, upon receiving an incoming packet, a network node may validate the packet (e.g., by comparing the actual packet size to the expected packet size associated with the packet type and/or by comparing the hop count to a pre-configured maximum hop count). The wireless lighting control network node may drop the incoming packet if the validation fails.

Responsive to successfully validating the incoming packet, the wireless lighting control network node may determine whether this node is the intended recipient of the packet. The wireless lighting control network node may recognize itself as an intended recipient of the incoming packet responsive to determining that that the destination address of the packet matches the wireless lighting control network node's own UID. The wireless lighting control network node may further recognize itself as an intended recipient of the incoming packet responsive to determining that the destination address of the packet matches the broadcast group identifier or one of the multicast group identifiers identifying multicast groups to which the wireless lighting control network node belongs. The wireless lighting control network node may then decrement the hop count and re-transmit the packet if the packet hop count exceeds zero and if the packet is not a unicast packet addressed to this node.

The wireless lighting control network node may then process the incoming packet if the wireless lighting control network node is the intended recipient of the packet (i.e., if the packet is a unicast packet addressed to this node, a multicast packet addressed to one of the multicast groups to which the receiving node belongs, or a broadcast packet). Processing the incoming packet may involve performing a lighting network management operation, e.g., storing in the local memory one or more parameter values specified by the packet, setting the local real-time clock to the time value specified by the packet, and/or compiling and transmitting a response packet reporting the values of one or more local sensors.

Figure 6:
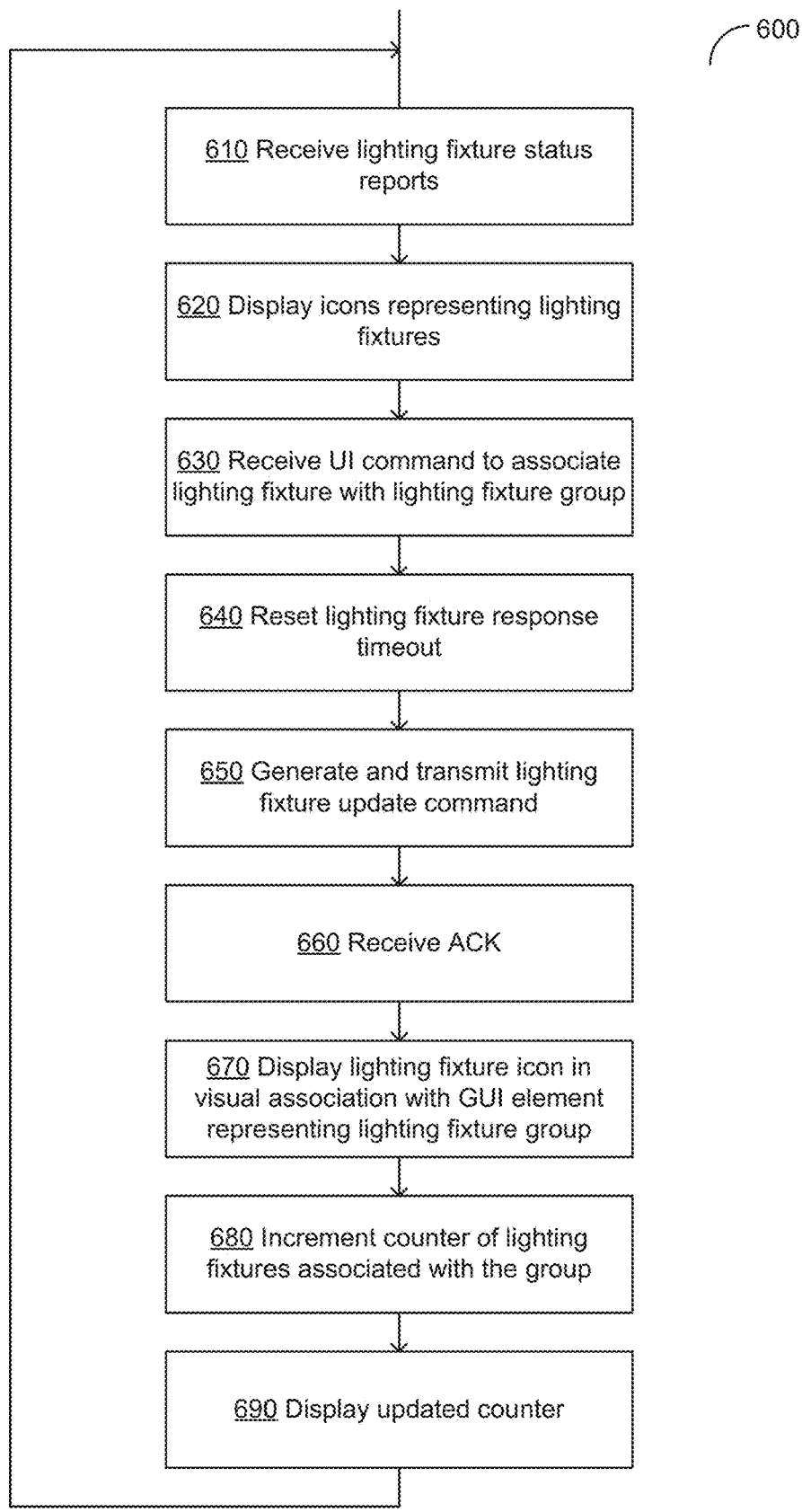
FIG. 6 depicts a flow diagram of an example method of lighting fixture grouping and configuration by a lighting network management application operating in accordance with one or more aspects of the present disclosure.

FIG. 6 depicts a flow diagram of an example method 600 of lighting fixture grouping and configuration by a lighting network management application operating in accordance with one or more aspects of the present disclosure. Method 600 and/or each of its individual functions, routines, subroutines, or operations may be performed by one or more processors of a mobile computing device (e.g., the mobile computing device 160 of FIG. 1) implementing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

At block 610, the computing device implementing the method may receive node identification messages from a plurality of lighting fixtures of a distributed lighting system. In an illustrative example, the node identification messages may be received in response to a node discovery request that has been broadcasted by the computing device. Each node identification message may reflect a motion status or an occupancy status of a lighting fixture which has transmitted the node identification message, as described in more detail herein above.

At block 620, the computing device may display a GUI screen comprising a plurality of icons, such that each icon represents a lighting fixture of the plurality of discovered lighting fixtures. In an illustrative example, the icons may be sorted by status update times reported by respective lighting fixtures and/or node identification message timestamps, as described in more detail herein above.

At block 630, the computing device implementing the method may receive a user's selection of a lighting fixture and a lighting fixture group with which the selected lighting fixture should be associated. In an illustrative example, the user's selection may be conveyed by a GUI command selecting an icon and dragging the selected icon to a box representing a lighting fixture group, as described in more detail herein above.

At block 640, the computing device may reset the lighting fixture response timeout for the selected lighting fixture.

At block 650, the computing device may generate an update command and transmit the generated command to the lighting fixture. The update command may include the lighting fixture group identifier and one or more fixture configuration parameter values which are shared by the fixtures comprised by the group. The fixture configuration parameters may include the unoccupied brightness level, the motion timeout, and/or the occupied brightness. In certain implementations, the update command may further include the identifier of the RF channel associated with the group. In certain implementations, the update command may further specify the current time, such that the lighting fixture may set its real-time clock to the specified time value. Transmitting the update command may involve appending the command to an outgoing communication queue, which may be processed by a dedicated thread of the lighting network management application, as described in more detail herein above.

Responsive to receiving, at block 660, an acknowledgement of the update command from the lighting fixture, the processing may continue at block 670; otherwise, a separate processing thread may detect the response timeout expiration, and may append an identifier of the non-responsive lighting fixture to a list of non-responsive lighting fixtures, which may be processed, e.g., by resending the update command to the non-responsive lighting fixtures, as described in more detail herein above.

At block 670, the computing device may display the icon representing the lighting fixture within the box representing a lighting fixture group and/or update one or more visual attributes of the icon representing the lighting fixture, thus indicating that the lighting fixture has been associated with the lighting fixture group. In an illustrative example, the computing device may change the color, the fill pattern, and/or other visual attributes of the icon representing the lighting fixture group.

At block 680, the computing device may update (e.g., increment or decrement) the counter of lighting fixtures associated with the lighting fixture group.

At block 690, the computing device may display the counter in a visual association with a GUI element representing the lighting fixture group, and the method may loop back to block 610.

Figure 7:
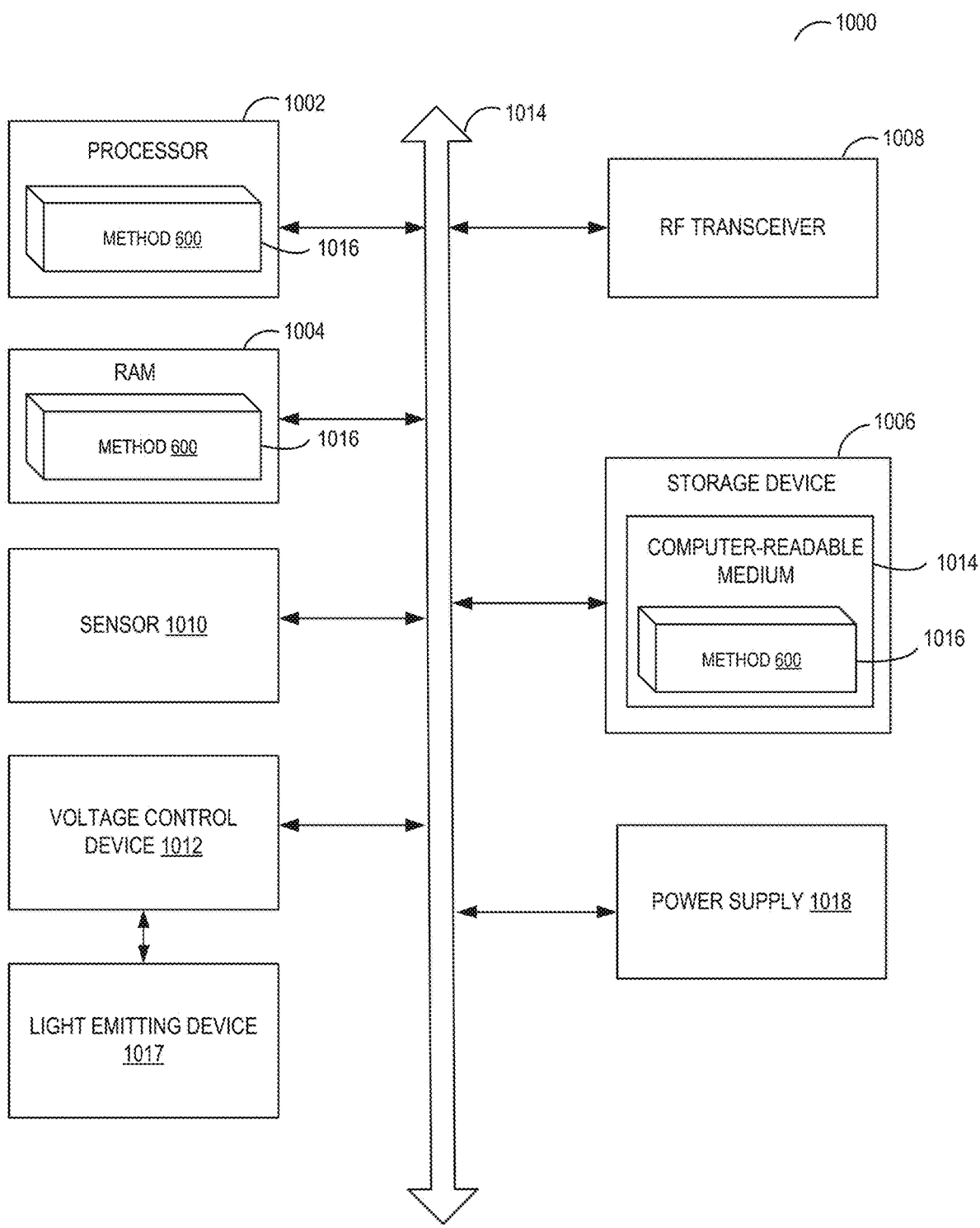
FIG. 7 schematically illustrates a component diagram of an example wireless lighting control network node operating in accordance with one or more aspects of the present disclosure.

FIG. 7 schematically illustrates a component diagram of an example wireless lighting control network node 1000 which may operate in accordance with one or more aspects of the present disclosure. Example wireless lighting control network node 1000 may comprise a processor device 1002, a memory 1004, a storage device 1006, a radio frequency transceiver 1008, one or more sensors 1010, and one or more voltage control devices 1012. The above referenced and other components may communicate via one or more communication buses 1014.

Processor 1002 may be represented by a general purpose microprocessor or a special-purpose microcontroller. Processor 1002 may be employed to execute instructions implementing method 600 of lighting fixture grouping and configuration.

Storage device 1006 may be provided, e.g., by a flash memory and may represent a non-transitory computer-readable storage medium 1014 storing executable instructions 1016 implementing method 600 of lighting fixture grouping and configuration. Executable instructions 1016 may also reside, completely or at least partially, within memory 1004 and/or within processor 1002. Executable instructions 1016 may further be transmitted or received over RF transceiver 1008.

RF transceiver 1008 may be provided, e.g., by Texas Instrument's CC1101 sub-GHz RF transceiver, or TI CC430 integrated RF microcontroller. Sensor 1010 may be provided, e.g., by any combination of illumination sensors, temperature sensors, motion sensors, and/or occupancy sensors. Voltage control device may be provided, e.g., by standard 0-10V inputs or outputs (ESTA E1.3 or IEC 60929 Annex E).

Each voltage control device may control the voltage supplied to one or more light emitting devices 1017. In an illustrative example each light emitting device 1017 may comprise one or more light emitting diodes (LEDs).

Wireless lighting control network node 1000 may further include a power supply 1018 which may be provided, e.g., by a mains-powered power supply combined with a backup battery and charger system for emergency lighting.

Wireless lighting control network node 1000 may further include various other components and/or interfaces, which are omitted from FIG. 7 for clarity and conciseness.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving, via a graphical user interface (GUI) rendered by a lighting network management application of a distributed lighting system, a command to associate a lighting fixture with a lighting fixture group;
   transmitting, to the lighting fixture, an update command specifying an identifier of the lighting fixture group, a value of a fixture configuration parameter, and a current time, wherein the update command encodes an operation to be performed by the lighting fixture, wherein the operation comprises setting a local real-time clock of the lighting fixture to the current time supplied by the update command;
   receiving, from the lighting fixture, an acknowledgement of the update command;
   incrementing a counter of lighting fixtures associated with the lighting fixture group; and
   displaying the counter in a visual association with a GUI element representing the lighting fixture group.

2. The method of claim 1, wherein transmitting the update command further comprises:
   appending the update command to a communication queue comprising one or more commands to be transmitted over the wireless lighting network.

3. The method of claim 1, further comprising:
   updating a counter of lighting fixtures associated with the lighting fixture group; and
   displaying the counter in a visual association with the GUI element representing the lighting fixture group.

4. The method of claim 1, further comprising:
   receiving occupancy status reports from a plurality of lighting fixtures of the distributed lighting system; and
   displaying a plurality of icons in a reverse order of occupancy status toggle times reported by respective lighting fixtures, wherein each icon represents a lighting fixture of the plurality of lighting fixtures.

5. The method of claim 1, further comprising:
   receiving motion status reports from a plurality of lighting fixtures of the distributed lighting system; and
   displaying a plurality of icons in a reverse order of motion status toggle times reported by respective lighting fixtures, wherein each icon represents a lighting fixture of the plurality of lighting fixtures.

6. The method of claim 1, wherein the fixture configuration parameter is provided by an unoccupied level brightness.

7. The method of claim 1, wherein the fixture configuration parameter is provided by a motion timeout.

8. The method of claim 1, wherein the fixture configuration parameter is provided by a daylight threshold.

9. The method of claim 1, wherein the fixture configuration parameter is provided by a daylight level.

10. A non-transitory computer-readable storage medium comprising executable instructions that, when executed by a wireless lighting control network node, cause the wireless lighting control network node to:
    receive, via a graphical user interface (GUI), a command to associate a lighting fixture with a lighting fixture group;
    transmit, to the lighting fixture, an update command specifying an identifier of the lighting fixture group, a value of a fixture configuration parameter, and a current time, wherein the update command encodes an operation to be performed by the lighting fixture, and wherein the operation comprises setting a local real-time clock of the lighting fixture to the current time supplied by the update command;
    receive, from the lighting fixture, an acknowledgement of the update command;
    increment a counter of lighting fixtures associated with the lighting fixture group; and
    display the counter in a visual association with a GUI element representing the lighting fixture group.

11. The non-transitory computer-readable storage medium of claim 10, further comprising executable instructions to cause the wireless lighting control network node to:
    display, via the GUI, an icon visually representing the lighting fixture in a visual association with the GUI element representing the lighting fixture group.

12. The non-transitory computer-readable storage medium of claim 10, further comprising executable instructions to cause the wireless lighting control network node to:
    receive node identification messages from a plurality of lighting fixtures of the distributed lighting system; and
    display a plurality of icons in a reverse order of status toggle times reported by respective lighting fixtures, wherein each icon represents a lighting fixture of the plurality of lighting fixtures.

13. The non-transitory computer-readable storage medium of claim 10, wherein the fixture configuration parameter is provided by one of: an unoccupied level brightness, a motion timeout, a daylight threshold, or a daylight level.

* * * * *